UNITED STATES PATENT OFFICE.

GUILLAUME DE MONTMOLLIN, OF BASEL, SWITZERLAND, ASSIGNOR TO SOCIETY OF CHEMICAL INDUSTRY IN BASLE, OF BASEL, SWITZERLAND.

ACID WOOL DYESTUFFS.

1,359,969.  Specification of Letters Patent.  Patented Nov. 23, 1920.

No Drawing.  Application filed December 13, 1919. Serial No. 344,513.

*To all whom it may concern:*

Be it known that I, GUILLAUME DE MONTMOLLIN, a citizen of the Swiss Republic, and resident of Basel, Switzerland, have invented new Acid Wool Dyestuffs, of which the following is a full, clear, and exact specification.

I have found that new dyestuffs, well appropriate for dyeing wool are obtained by transforming the diaminodiarylsulfones, especially the 2.5 and 2.4-diaminodiarylsulfones, into monoacidylderivatives, diazotizing these latter and combining the resulting diazoderivatives with 2-aminonaphthalene-compounds and especially with 2-aminonaphthalenesulfonic acids and 2-amino-naphtholsulfonic acids. These dyestuffs constitute, in a dry state, red-brown to dark-violet and dark-brown powders, dissolving in water and with orange-red to brown and violet colorations and in concentrated sulfuric acid with orange to violet colorations and dyeing wool in an acid bath very equal orange-red to blackish-violet tints very fast to washing and extraordinarily fast to light.

Example 1.

290 parts of 2.5-diaminobenzene-p-toluenesulfone (obtained according to the German Patent No. 282214) are dissolved in the sixfold quantity of alcohol and to the solution thus obtained 144 parts of acetic anhydrid are added. The monoacetyl-2.5-diaminodiarylsulfone separates immediately in form of a white crystalline precipitate, which is filtered off and washed at first with some alcohol and afterward with much water. (Recrystallized from acetone the 2.8.6 - aminonaphtholsulfonic acid in 1000 182 to 183° C.). The moist mass is then suspended in 1000 parts of water and to this suspension are added firstly 74 parts of sodium nitrite and afterward at once 250 parts of concentrated hydrochloric acid. A diazo-compound difficultly soluble is formed; it is separated by filtration and introduced into a suspension of 238 parts of 2.8.6-aminonaphtolsulfonic acid in 1000 parts of water. The mass is gradually neutralized with 100 parts of sodium acetate. When all diazocompound has disappeared, the mass is made alkaline by sodium carbonate, heated slightly and the dyestuff is precipitated by adding some common salt, filtered off and dried.

The dyestuff constitutes in a dry state a violet-black power, dissolving in water to a blue-red solution and in sulfuric acid to a brown-red solution. It dyes wool in an acid bath in very equal blue-red tints fast to washing and extraordinarily fast to light.

If in this example, the 2.8.6-aminonaphtholsulfonic acid is replaced by the equivalent quantity of 2.8.6-phenylaminonaphtholsulfonic acid, there is obtained a considerably bluer dyestuff which constitutes in a dry state a violet-brown powder dissolving in water and in sulfuric acid to blue-red solutions. It dyes wool in an acid bath very equal violet tints fast to washing and extraordinarily fast to light. If, on the contrary, in this example the equivalent quantity of 2-naphthylamin-6-sulfonic acids is substituted for the 2.8.6-aminonaphtholsulfonic acid, there results an orange-red dyestuff which constitutes in a dry state a red powder dissolving in water and in sulfuric acid to orange-red solutions and dyes wool in an acid bath very equal red tints fast to washing and to light.

Example 2.

290 parts of 2.5-diaminobenzene-p-toluenesulfone are dissolved in the eightfold quantity of acetic acid and to the solution obtained is added a solution of 162 parts of phthalic anhydrid. The phthalamic acid of the 2.5-diaminobenzene-p-toluenesulfone precipitates immediately. It is filtered off, washed with some alcohol and afterward largely with water.

The phthalamic acid of the 2.5-diaminobenzene-p-toluenesulfone

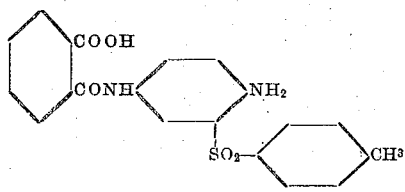

is formed by white felted little needles which are decomposed, when heated, before they melt. The corresponding anil

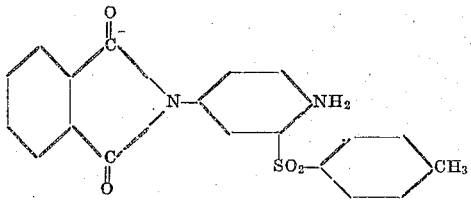

which is formed by dissolving the acid in glacial acetic acid melts at 232° C.

The phthalamic acid well washed with water is poured into 10000 parts of water and transformed in the corresponding sodium salt by adding 40 parts of sodium hydroxid. The diazotation is effected as in Example 1 and the diazo-compound filtered off is introduced into a suspension of 238 parts of 2.8.6-aminonaphtholsulfonic acid. The mass is gradually neutralized with 82 parts of sodium acetate. When all the diazocompound has disappeared, the mass is neutralized with sodium carbonate and the dyestuff precipitated by addition of common salt, filtered off and dried. It constitutes, in a dry state, a violet-brown powder dissolving in water to brownish-violet solutions and in concentrated sulfuric acid to violet solutions. It dyes wool in an acid bath very equal violet-tints fast to washing and extraordinarily fast to light.

If in this example the 2.8.6-phenylaminonaphtholsulfonic acid is substituted for the 2.8.6-aminonaphtholsulfonic acid, there results a dark-violet dyestuff which constitutes, in a dry state, a black powder dissolving in water and in sulfuric acid to blue-violet solutions and dyes wool in an acid bath black-violet tints fast to washing and light.

*Example 3.*

422 parts of 1.4-naphthylenediamine-p-toluenesulfone-6-sulfonic acid (this acid is obtained from 1.4-naphthylene-diamine-6-sulfonic acid according to the process of the German Patent No. 282214 and constitute a colorless powder forming with alkalis yellow salts and with nitrous acid a diazocompound difficultly soluble) are dissolved in 4000 parts of water and 60 parts of sodium carbonate and to the obtained solution are added 150 parts of acetic anhydrid at 60° C. From the resulting colorless solution the new acetylcompound is precipitated in the form of clear flocks by neutralizing the excess of acetic acid with sodium carbonate and adding common salt. In the form of its sodium salt the new acetylcompound is colorless in contradistinction to the not acetylated sulfone. The acetylcompound separated by filtration is diazotized as indicated in the Examples 1 and 2, the intense yellow colored diazocompound separated by filtration is combined with 165 parts of ethyl-beta-naphthylamine in a medium acidulated by acetic acid. The resulting red-violet dyestuff is isolated in the usual way. It constitutes in a dry state a dark-brown powder and dissolves in water to blue-red and in concentrated sulfuric acid to orange solutions. It dyes wool in an acid bath blue-red tints fast to washing and to light.

In the following tabular exhibit are characterized a certain number of dyestuffs able to be prepared according to the invention and the acidyldiaminosulfones occurring as intermediary products in the course of their preparation.

| The diazoderivative of the— | Combined with— | Gives a dyestuff constituting in a dry state a— | Dissolving— | | And dyes wool— |
|---|---|---|---|---|---|
| | | | In water to— | In SO₄H₂ to— | |
| Carboxyethyl-2.5-diamino-p-toluenesulfone................ (structure with C₂H₅OCONH, NH₂, SO₂, CH₃) (The hydrochlorate constitutes colorless needles.) | 2.8.6-aminonaphtholsulfonic acid...... | Violet-brown powder. | Blue-red solutions. | Brown-violet solutions. | Blue-red tints. |
| Urea of 2.5-diamino-p-toluene-sulfone.......... (structure with NH₂, NH.CO.NH, SO₂, CH₃) (Clear crystalline powder melting at 191° C.) | 2.8.6-aminonaphtholsulfonic acid...... | Violet-brown powder. | Violet-brown solutions. | Red-brown solutions. | Blue-red tints. |
| Monobenzoyl-2.5-diaminobenzene-p-toluenesulfone....... (structure with CONH, NH₂, SO₂, CH₃) (Colorless needles melting at 186° C.) | 2.8.6-aminonaphtholsulfonic acid...... | Violet-black powder. | Brown-red solutions. | Blue-red solutions. | Blue-red tints. |
| Monoacetyl-2.5-diaminobenzene-p-chlorbenzenesulfone..... (structure with CH₃-CONH, NH₂, SO₂, Cl) (Colorless powder melting at 198° C.) | 2.8.6-aminonaphtholsulfonic acid...... | Violet-black powder. | Blue-red solutions. | Brown-red solutions. | Blue-red tints. |

| The diazoderivative of the— | Combined with— | Gives a dyestuff constituting in a dry state a— | Dissolving— | | And dyes wool— |
|---|---|---|---|---|---|
| | | | In water to— | In SO$_4$H$_2$ to— | |
| Phthalamic acid of the 2.5-diaminobenzene-p-chlorobenzenesulfone [structure: benzene with -CONH-, -COOH, and second ring with -NH$_2$, -SO$_2$-, -Cl] (Colorless needles; the anile melts at 233° C.) | 2.8.6-aminonaphtholsulfonic acid | Violet-black powder. | Red-violet solutions. | Brown solutions. | Red-violet tints. |
| Monoacetyl-2.4-diaminobenzene-p-toluene-sulfone [structure: CH$_3$CONH-, -NH$_2$, -SO$_2$-, -CH$_3$] (Colorless needles melting at 162° C.) | 2.6-naphthylaminesulfonic acid (Bronner) | Red-brown powder. | Orange-red solutions. | Orange-red solutions. | Orange-red tints. |
| | 2.8.6-aminonaphtholsulfonic acid | Red-brown powder. | Blue-red solutions. | Blue-red solutions. | Blue-red tints. |
| Monoacetyl-1.2-naphthylenediamine-p-toluenesulfone-6-sulfonic acid [structure: NH$_2$, -SO$_2$-, -CH$_3$, HO$_3$S, NHCOCH$_3$] | Ethyl-β-naphthylamin | Brown powder. | Blue-red solutions. | Brown-orange solutions. | Blue-red tints. |

What I claim is:

1. As new products, the herein described acid wool dyestuffs derived from monoacidylderivatives of diaminodiarylsulfones and 2-aminonaphthalene compounds, constituting in a dry state red-brown to dark-brown and violet powders, soluble in water with orange-red to brown and violet colorations and in concentrated sulfuric acid with orange to violet colorations and dyeing wool in an acid bath orange-red to blackish-violet tints fast to washing and to light.

2. As new products the herein described acid wool dyestuffs derived from monoacetylderivatives of diaminodiarylsulfones and 2-aminonaphthalenesulfonic compounds, consisting in a dry state red-brown to dark-brown and violet powders, soluble in water with orange-red to brown and violet colorations and in concentrated sulfuric acid with brown to violet colorations and dyeing wool in an acid bath orange-red to blackish-violet tints fast to light and to washing.

3. As new products the herein described acid wool dyestuffs derived from monoacetylderivatives of diaminodiarylsulfones and 2-aminooxynaphthalenesulfonic compounds, constituting in a dry state red-brown to dark-brown and violet powders, soluble in water with red to brown and violet colorations and in concentrated sulfuric acid with brown to violet colorations and dyeing wool in an acid bath orange-red to blackish-violet tints fast to light and to washing.

4. As a new article of manufacture the herein described acid wool dyestuff corresponding to the formula

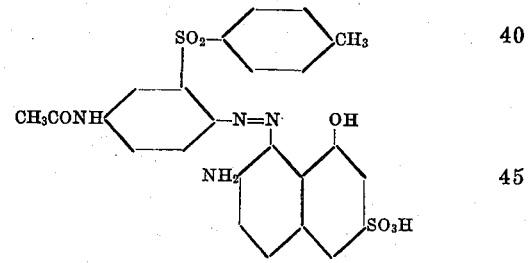

constituting in a dry state a dark violet powder, which dissolves in water with blue-red and in concentrated sulfuric acid with red-brown colorations dyeing wool in an acid bath very equal blue-red tints fast to washing and extraordinarily fast to light.

In witness whereof I have hereunto signed my name this 25th day of November, 1919, in the presence of two subscribing witnesses.

GUILLAUME de MONTMOLLIN.

Witnesses:
 WILLIAM E. HOLLAND,
 AMAND RITTER.